Oct. 31, 1961 M. S. BOWNE 3,006,663
PIPE CLAMP WITH RESILIENT MEMBER
Filed Aug. 11, 1958 3 Sheets-Sheet 1
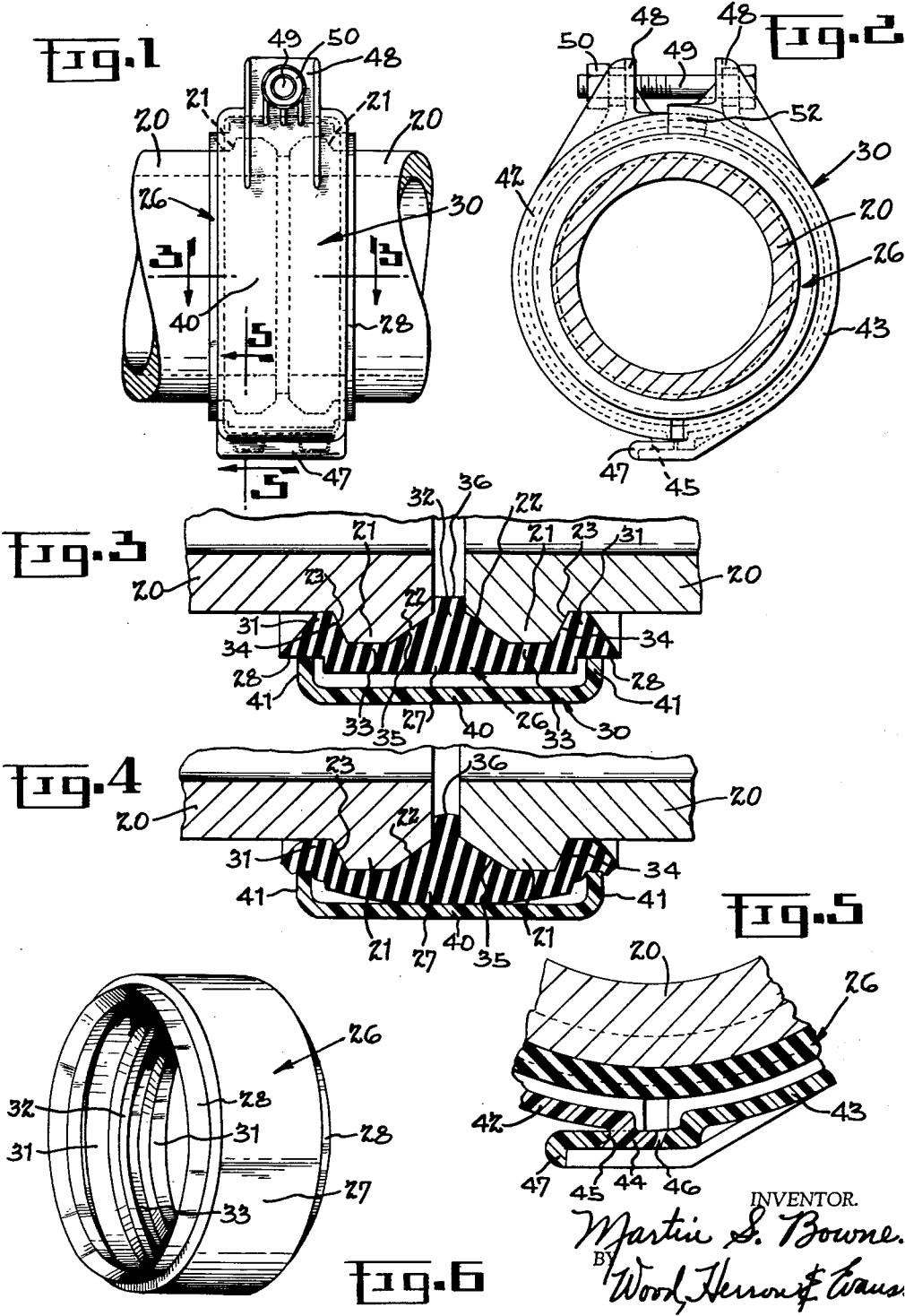

Oct. 31, 1961   M. S. BOWNE   3,006,663
PIPE CLAMP WITH RESILIENT MEMBER
Filed Aug. 11, 1958   3 Sheets-Sheet 2
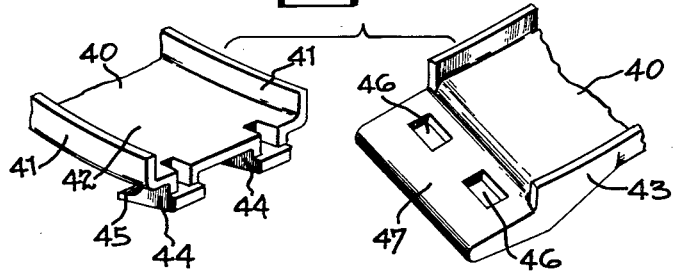
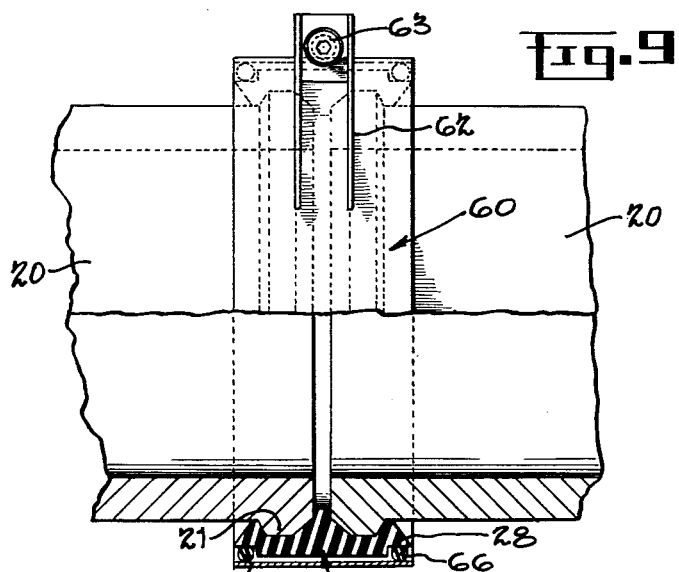
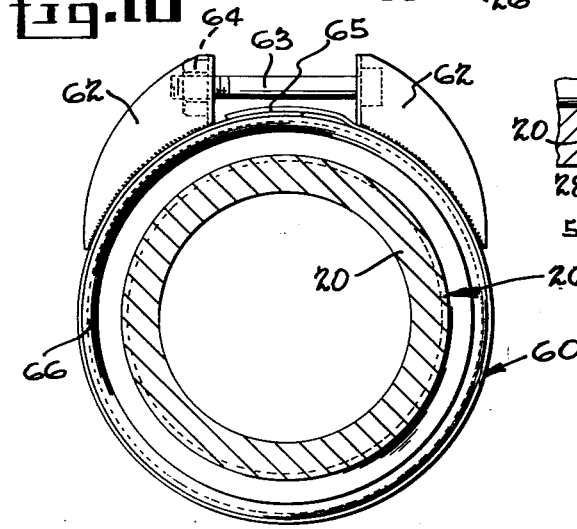
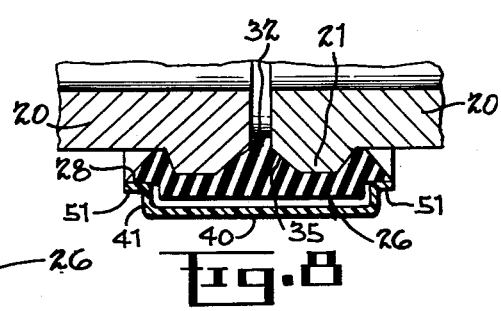
INVENTOR.
Martin S. Bowne.
BY Wood, Herron & Evans.
ATTORNEYS.

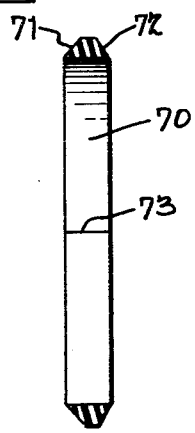
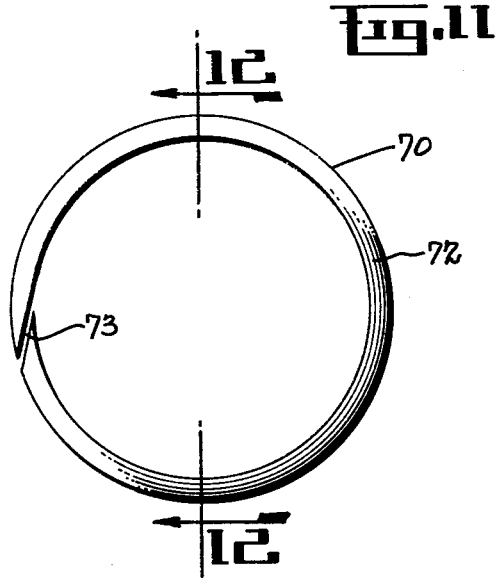
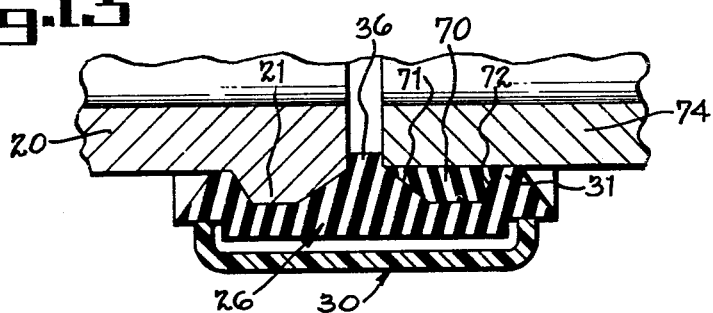
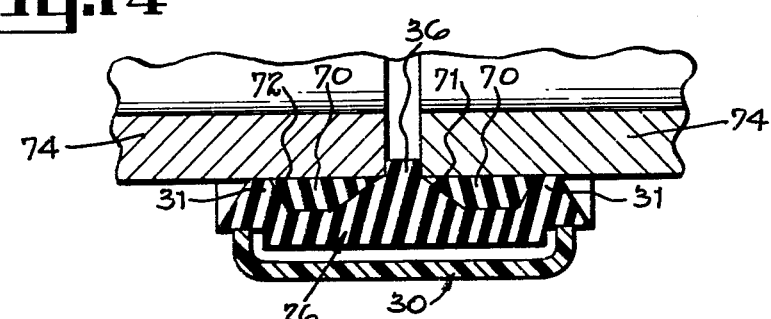

United States Patent Office 3,006,663
Patented Oct. 31, 1961

3,006,663
PIPE CLAMP WITH RESILIENT MEMBER
Martin S. Bowne, Clearfield, Ky., assignor to Lee Clay Products Company, Clearfield, Ky., a corporation of Kentucky
Filed Aug. 11, 1958, Ser. No. 754,488
6 Claims. (Cl. 285—233)

The present invention relates to a pipe joint assembly, and particularly to a sleeve and girth band clamp design encircling the shouldered ends of pipe to be joined, the clamp and sleeve being compressed against the pipe in radial and axial directions.

It has been an objective of this invention to provide a pipe joint assembly cooperating with the shouldered ends of double hub pipe to create a more perfect seal than has been heretofore possible, the objective being attained by encircling the shoulders of adjoining pipe with a gasket type sleeve and placing the sleeve under compression stress in both radial and axial directions.

It has been another objective of this invention to provide a pipe joint assembly including an encircling elastomeric gasket having a pair of annular, spaced recesses which receive the shouldered ends of adjacent double hub pipes, and a girth band clamp disposed on the outside of said gasket, the band having annular inwardly directed projections which, when applied to the gasket, impart axial and radial components of pressure by the gasket onto the pipe shoulder.

It has been still another objective of the invention to provide a pipe joint assembly as described in the preceding paragraph in which the annular grooves are formed by three, radially inwardly directed, spaced V-shaped portions, the girth band projections engaging the gasket at the area of the outer V-shaped portions to pivot those portions inwardly thereby causing the axially inner surfaces of said portions to press on the pipe shoulders tending to draw the pipe ends together. The tendency of the pipe ends to move toward each other is resisted by the central V-shaped portion whereby the central V-shaped portion is compressed between the pipe ends thereby forming an additional sealing area.

It has been yet another objective of the invention to provide a pipe joint assembly as described above in which the inner surface of the girth band between the annular projections is engageable with the central portion of the outer surface of the gasket whereby outward bowing of the gasket, caused by the pivoting of the V-shaped portions is resisted by the girth band, whereby the gasket is placed under inwardly directed compression stress at its outer edge portions and its central portions.

It has been yet another objective of the invention to provide a pipe joint assembly which includes an encircling elastomeric gasket having a pair of adjacent double hub pipes, and which can be adapted for joining either two adjacent plain ended pipes or a hub end pipe to a plain end pipe by inserting a filter strip having a cross sectional configuration conforming to the gasket annular recesses.

It has been yet another objective of the invention to provide a pipe joint assembly which is inexpensive to manufacture, easily applied and leak proof.

These and other objectives of the invention will become more readily apparent from the following detailed description of the invention taken in conjunction with the accompanying drawings in which:

FIG. 1 is a side elevational view of the pipe joint assembly constructed in accordance with the present invention, FIG. 2 is an elevational view partly in section thereof, FIG. 3 is a cross sectional view taken along lines 3—3 of FIG. 1, FIG. 4 is a cross sectional view taken along lines 3—3 of FIG. 1 after clamping pressure has been applied, FIG. 5 is a cross sectional view taken along lines 5—5 of FIG. 1, FIG. 6 is a perspective view of the gasket, FIG. 7 is a fragmentary exploded view in perspective showing a hinge construction for the girth band, FIG. 8 is a fragmentary cross sectional view of an alternative embodiment of the invention, FIG. 9 is a side elevational view partly in section of an alternative embodiment of the invention, FIG. 10 is an end elevational view thereof, FIG. 11 is an elevational view of a ring for adapting the invention to plain end pipe, FIG. 12 is a cross sectional view taken along lines 12—12 of FIG. 11, and FIGS. 13 and 14 are sectional views showing the joint assembly utilizing the adapter ring.

The present invention is, of course, useful with pipes having a plane end configuration but is particularly applicable to pipes having a barrel portion and shouldered end portions such as double hub type pipe shown in the drawings and designated by numeral 20. The pipe has shoulders 21 which, through the forming process, are provided with axially inner inclined surfaces 22 and axially outer inclined surfaces 23.

As best illustrated in FIG. 3, the pipe shoulders are embraced by a gasket or sleeve 26 of elastomeric material such as rubber whose outer surface has a central portion 27 and shoulders 28 at the edge portions thereof to receive a girth band clamp 30. The radially inner surface is formed by two truncated V-shaped beads 31 at the edges thereof and a central truncated V-shaped bead 32 joined by intermediate sections 33. The V-shaped beads 31 have axially inwardly directed surfaces 34 engageable with the pipe shoulder surfaces 23 and axially outer surfaces which are inwardly chamfered so as to diverge outwardly and overhang the barrel portion of the pipe. The central V-shaped bead 32 has its inclined surfaces 35 in engagement with the pipe shoulder surfaces 22. The central V-shaped bead terminates in an annular ridge 36 of rectangular cross section which, upon application of clamping pressure is compressed between the end surfaces of adjoining pipes.

In the embodiment of FIGS. 1 to 7 the girth band clamp 30 is preferably molded of a plastic material which is rigid enough for the application of pressure to the gasket, but somewhat deformable to conform to pipes which may be slightly out-of-round. The girth band clamp is of channel section having a central portion 40 and inwardly directed edge projections 41 received by the shoulders 28 of the gasket 26.

The girth band is formed in two sections 42 and 43. The section 42 is provided with radially outwardly projecting hinge posts 44 recessed at 45 to receive hinge apertures 46 in a hinge portion 47 of the girth band section 43. The ends of the girth band members remote from the hinge are provided with bolt receiving projections 48 which are transversely apertured to receive a bolt 49 having a nut 50 by which the projections 48 can be brought together to clamp the girth band against the gasket 26. The end portion 52 of the channel section on the girth band member 43 is enlarged to permit the adjacent channel section on the girth band member 42 to telescope within the end portion 52 during clamping. With this design, it is possible to bring radially inwardly directed pressure to bear against gasket 26 substantially uniformly throughout its circumference.

In operation, the gasket 26 is slipped onto the shoulders 21 of adjacent pipes. The girth band is brought into position on the gasket and the nut 50 tightened on bolt 49 to apply the radially inwardly directed pressure stress onto the gasket. The stress imparted by the girth band is focused on the area of engagement of the projections 41 on shoulders 28 of the gasket.

As illustrated in FIG. 4, the application of pressure to shoulder 28 causes the overhanging portions of beads 31 to pivot or tip inwardly thereby bulging the beads into axial and circumferential sealing engagement with the shoulder surfaces 23. The pressure, because of the inclination of the engaging surfaces, has both radial and axial components. The axial component tends to move the pipes toward each other. At the same time, the inward pivoting of the V-shaped beads 31 causes a radially outward bowing of the central portion of the gasket and brings the outer surface of the gasket to bear against the inner surface of the girth band. Thus complete outward bowing of the gasket is resisted and the gasket is placed under a radially inwardly directed compression stress. This stress coupled with the movement of the pipe ends toward each other causes an application of pressure on the central V-shaped beads so that the annular ridge 36 is compressed between the transverse end surfaces of the pipe and there is a sealing pressure applied between the shoulder surfaces 22 and the contiguous gasket surfaces 35.

It will be appreciated that the design of the gasket and girth band of the present invention provides an automatic compensation for lack of uniformity in pipe ends, that is, for example, out-of-round pipes. The inward pivoting of the V-shaped portions of the gasket which causes the central bowing of the gasket, which is in turn resisted by the girth band, causes a virtual lock of the rubber gasket under compression. If the pipe is out of round, after compression, there will be high and low points of compression about the circumference of the gasket. The compaction of the rubber at the higher points of compression will ease off toward the points of lesser compaction so that, in time, an average uniform compression about the hubs is developed. If there is no leak at the start of the points of lesser compaction, there will be even less likelihood of leakage after a period of time.

An alternative embodiment is illustrated in FIG. 8. The principal change which distinguishes the embodiment of FIG. 8 from the embodiment of FIGS. 1 to 7 is the integral molding of a flange 51 to the projections 41. The flanges 51 extend axially outwardly from the edges of the girth band with the result that substantially the whole gasket is covered by the girth band. It has been found that the addition of the flanges 51 which bear against the critical area of the gasket above the V-shaped beads considerably improves the effectiveness of the joint assembly. Through the use of the flange, higher pressure by the gasket on the pipe can be attained with a great deal less tension on the clamping bolt.

Additionally, the design of FIG. 8 more completely contains the rubber gasket sleeve. By completely containing the chamfered ends are prevented from bulging outwardly whereby a greater amount of rubber is confined and pressed against the hub surfaces. The thus retained compression, permits a greater amount of pressure to be applied to the pipe ends and in turn increases the internal fluid pressure applied to the pipe joint without leaking.

The alternative embodiment of FIGS. 9 and 10 functions substantially identically to that of FIGS. 1 to 7. The difference between the two embodiments resides in the girth band which in this embodiment is not in two sections. Rather, the girth band is formed of a single strip 60 having projections 62 transversely apertured to receive a bolt 63 and a clamping nut 64. The length of the strip 60 is slightly greater than the outer circumference of the gasket 26 so as to provide the overlapping area indicated at 65 whereby the gasket is completely encircled by the strip 60. The strip 60 may be made of sheet steel preferably coated with rubber, plastic or other suitable material which will resist the deleterious effects of the earth in which the pipe will be lodged.

A pair of O-rings 66 are lodged in the shoulders 28 of the gasket and are clamped against the shoulders of the gasket by the girth band 60 and in this manner function substantially identically to the projections 41 of the girth band of the previous embodiments. Thus, the girth band of FIGS. 9 and 10 causes an application of pressure by the gasket on the pipe ends in the manner previously described in connection with FIG. 3.

It has been demonstrated by the disclosure of the several embodiments that there are several forms which the invention might take without depending from the essential inventive aspects of the pipe joint assembly. The important feature common to all embodiments within the purview of the invention is the application of compression stress to the edge portions of the gasket causing the edge portions to pivot inwardly resulting in a sealing pressure on the pipe shoulders having axial and radial components coupled with the resistance to bowing applied by the central surface of the girth band which in turn imparts additional sealing pressure to the end surfaces of the pipes.

There will be instances in which it is necessary to join a plain end pipe to a pipe having a hub shoulder as disclosed in the foregoing embodiments. Also there may be instances in which it is desirable to use the joint assembly with two plain end pipes. To render the joint assembly most suitable for use with plain end pipes, an adapter ring 70, shown in FIGS. 11 and 12, is provided and is assembled with the gasket 26 as shown in FIGS. 13 and 14.

The adapter 70 is ring shaped and chamfered at its outer corners as at 71 and 72 to be received in the recess 27 formed in the gasket 26. The adapter ring 70 is scarfed, that is, cut at an angle, at 73 so that when applied to a plain end pipe, as illustrated in FIG. 13, the ends are drawn together thereby effectively forming a seal at the cut ends.

When the ring is applied as shown in FIGS. 13 or 14, the compression applied to the gasket 26 by the girth clamp 30 presses the adapter ring 70 tightly against the surface of a plain end pipe 74 to form the seal.

It will be appreciated that the tendency of the V-shaped leads 31 to pivot inwardly compresses the adapter ring 70 in an axial direction which in turn tends to cause the adapter ring 70 to bulge radially thereby applying a radial pressure to the end of the pipe 74.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

Having described my invention, I claim:

1. A pipe joint combination comprising a pair of pipes each having a barrel portion terminating in an annular shoulder at at least one end thereof, said pipes being disposed in end-to-end relation with the annular shoulders adjacent each other, a continuous elastomeric sleeve circumferentially straddling said adjacent shoulders, annular inwardly directed beads fixed against axial outward movement to said sleeve and located adjacent the respective endwise portions thereof, the said beads respectively having internal shoulder faces engaging the axially outer surfaces of said shoulders to confine the shoulders between said beads, each of said beads having its axially outer surface chamfered inwardly to provide a portion, which said portion overhangs and is spaced outwardly from said barrel portion, said sleeve also comprising means engaging said adjacent pipe ends to prevent substantial relative movement of the pipe ends toward one another, a contractible clamp encircling said sleeve and having inwardly directed annular projections at the endwise portions thereof engaging the said outwardly overhanging portions of said beads, the clamp having portions disposed inwardly adjacent said projection spaced from said sleeve, whereby said projections are effective to pivot inwardly the overhanging portions of said beads upon contraction of said clamp, said overhanging portions of said beads being sufficiently rigidly interconnected to said beads to deform said beads into generally axial and circumferential sealing engagement with said shoulders as said overhanging portions are pivoted inwardly upon contraction of said clamp.

2. A pipe joint combination comprising a pair of pipes each having a barrel portion terminating in an annular shoulder at at least one end thereof, said pipes being disposed in end-to-end relation with the annular shoulders adjacent each other, a continuous ring-shaped elastomeric sleeve circumferentially straddling said adjacent shoulders and having two inwardly directed generally V-shaped beads fixed against axial outward movement to said sleeve and located adjacent the respective endwise portions thereof, the said beads having their respective axially inner surfaces engaging the axially outer surfaces of said shoulders to confine the shoulders between said beads, each of said beads having its axially outer surface chamfered inwardly to provide a portion, which said portion overhangs and is spaced outwardly from said barrel portion, said sleeve also comprising means engaging said adjacent pipe ends to prevent substantial relative movement of the pipe ends toward one another, a contractible clamp encircling said sleeve and having inwardly directed annular projections at the endwise portions thereof engaging the said outwardly overhanging portions of said beads, the clamp having portions disposed inwardly adjacent said projection spaced from said sleeve, whereby said projections are effective to pivot inwardly the overhanging portions of said beads upon contraction of said clamp, said overhanging portions of said beads being sufficiently rigidly interconnected to said beads to deform said beads into generally axial and circumferential sealing engagement with said shoulders as said overhanging portions are pivoted inwardly upon contraction of said clamp.

3. A pipe joint combination comprising a pair of pipes each having a barrel portion terminating in an annular shoulder at at least one end thereof, said pipes being disposed in end-to-end relation with the annular shoulders adjacent each other, a continuous ring-shaped elastomeric sleeve circumferentially straddling said adjacent shoulders and having two inwardly directed generally V-shaped beads fixed against axial outward movement to said sleeve and located adjacent the respective endwise portions thereof, the said beads having their respective axially inner surfaces engaging the axially outer surfaces of said shoulders to confine the shoulders between said beads, each of said beads having its axially outer surface chamfered inwardly to provide a portion, which said portion overhangs and is spaced outwardly from said barrel portion, said sleeve also comprising a V-shaped bead disposed at the center section of said sleeve, said last named bead engaging said adjacent pipe ends and being effective to prevent substantial relative movement of the pipe ends toward one another, a contractible clamp encircling said sleeve and having inwardly directed annular projections at the endwise portions thereof engaging the said outwardly overhanging portions of said beads, the clamp having portions disposed inwardly adjacent said projection spaced from said sleeve, whereby said projections are effective to pivot inwardly the overhanging portions of said beads upon contraction of said clamp, said overhanging portions of said beads being sufficiently rigidly interconnected to said beads to deform said beads into generally axial and circumferential sealing engagement with said shoulders as said overhanging portions are pivoted inwardly upon contraction of said clamp.

4. A pipe joint combination comprising a pair of pipes each having a barrel portion terminating in an annular shoulder at at least one end thereof, said pipes being disposed in end-to-end relation with the annular shoulders adjacent each other, a continuous ring-shaped elastomeric sleeve circumferentially straddling said adjacent shoulders and having two inwardly directed generally V-shaped beads fixed against axial outward movement to said sleeve and located adjacent the respective endwise portions thereof, the said beads having their respective axially inner surfaces engaging the axially outer surfaces of said shoulders to confine the shoulders between said beads, each of said beads having its axially outer surface chamfered inwardly to provide a portion, which said portion overhangs and is spaced outwardly from said barrel portion, said sleeve also comprising a V-shaped bead disposed at the center section of said sleeve, said last named bead engaging said adjacent pipe ends and being effective to prevent substantial relative movement of the pipe ends toward one another, a contractible clamp encircling said sleeve and having inwardly directed annular projections at the endwise portions thereof engaging the said outwardly overhanging portions of said beads, the clamp having its inner surface between said projections spaced from the outer surface of said sleeve whereby, when said clamp is compressed, said projections will pivot said V-shaped beads into engagement with said shoulders, thereby pressing said pipes axially toward each other to press said central V-shaped bead between said annular shoulders, the space between said clamp and sleeve permitting limited radially outward flow of said sleeve material.

5. A pipe joint combination comprising a pair of pipes each having a barrel portion terminating in an annular shoulder at at least one end thereof, said pipes being disposed in end-to-end relation with the annular shoulders adjacent each other, a continuous elastomeric sleeve circumferentially straddling said adjacent shoulders, annular inwardly directed beads fixed against axial outward movement to said sleeve and located adjacent the respective endwise portions thereof, the said beads respectively having internal shoulder faces engaging the axial outer surfaces of said shoulders to confine the shoulders between said beads, each of said beads having its axially outer surface chamfered inwardly to provide a portion, which said portion overhangs and is spaced outwardly from said barrel portion, said sleeve also comprising means engaging said adjacent pipe ends to prevent substantial relative movement of the pipe ends toward one another, a contractible clamp encircling said sleeve and having inwardly directed annular projections at the endwise portions thereof engaging the said outwardly overhanging portions of said beads, the clamp having portions disposed inwardly adjacent said projection spaced from said sleeve, said clamp including two generally semi-circular members of channel-shaped cross section, means hinging said members together at one end thereof, and clamping means for drawing the other ends of said members together, whereby said projections are effective to pivot inwardly the overhanging portions of said beads upon contraction of said clamp, said overhanging portions of said beads being sufficiently rigidly interconnected to said beads to deform said beads into generally axial and circumferential sealing engagement with said shoulders as said overhanging portions are pivoted inwardly upon contraction of said clamp.

6. A pipe joint combination comprising a pair of pipes each having a barrel portion terminating in an annular shoulder at at least one end thereof, said pipes being disposed in end-to-end relation with the annular shoulders adjacent each other, a continuous elastomeric sleeve circumferentially straddling said adjacent shoulders, annular inwardly directed beads fixed against axial outward movement to said sleeve and located adjacent the respective endwise portions thereof, the said beads respectively having internal shoulder faces engaging the axially outer surfaces of said shoulders to confine the shoulders between said beads, each of said beads having its axially outer surface chamfered inwardly to provide a portion, which said portion overhangs and is spaced outwardly from said barrel portion, said sleeve also comprising means engaging said adjacent pipe ends to prevent substantial relative movement of the pipe ends toward one another, a contractible clamp encircling said sleeve and having inwardly directed annular projections at the endwise portions thereof engaging the said outwardly overhanging portions of said beads, the clamp having portions disposed inwardly adjacent said projection spaced from said sleeve, whereby said projections are effective to pivot inwardly the overhanging portions of said beads upon contraction of said clamp, said overhanging portions of said beads being sufficiently rigidly interconnected to said beads to deform said beads into generally axial and circumferential sealing engagement with said shoulders as said overhanging portions are pivoted inwardly upon contraction of said clamp, the inner surface of said clamp being engageable by the central outer surface of said sleeve to resist bowing of said sleeve incidental to the said pivotal deformation of said beads upon contraction of said clamp.

References Cited in the file of this patent

UNITED STATES PATENTS

| | | |
|---|---|---|
| 1,888,260 | Clark | Nov. 22, 1932 |
| 1,988,694 | Mallay | Jan. 22, 1935 |
| 2,474,431 | Lipman | June 28, 1949 |
| 2,758,852 | Newell | Aug. 14, 1956 |
| 2,826,437 | Detweiler | Mar. 11, 1958 |
| 2,828,986 | Mahoff et al. | Apr. 1, 1958 |

FOREIGN PATENTS

| | | |
|---|---|---|
| 6,358 | Great Britain | Mar. 29, 1894 |
| 549,183 | Great Britain | Nov. 10, 1942 |